United States Patent
Potier et al.

(10) Patent No.: US 9,756,772 B2
(45) Date of Patent: Sep. 12, 2017

(54) AGRICULTURAL MACHINE WITH AT LEAST ONE ARTICULATED SEEDER BAR

(71) Applicant: KUHN S.A., Saverne (FR)

(72) Inventors: Philippe Potier, Zittersheim (FR);
Guillaume Schmitt, Surbourg (FR);
Olivier Constant, Weiterswiller (FR)

(73) Assignee: KUHN S.A., Saverne (FR)

( * ) Notice: Subject to any disclaimer, the term of this patent is extended or adjusted under 35 U.S.C. 154(b) by 92 days.

(21) Appl. No.: 14/829,935

(22) Filed: Aug. 19, 2015

(65) Prior Publication Data
US 2016/0050839 A1 Feb. 25, 2016

(30) Foreign Application Priority Data

Aug. 25, 2014 (FR) .................................. 14 57955

(51) Int. Cl.
*A01B 73/06* (2006.01)
*A01C 7/20* (2006.01)

(52) U.S. Cl.
CPC ............ *A01B 73/065* (2013.01); *A01C 7/208* (2013.01)

(58) Field of Classification Search
CPC .. A01C 7/208; A01C 7/20; A01C 7/00; A01B 73/065; A01B 73/06; A01B 73/02; A01B 73/00
See application file for complete search history.

(56) References Cited

U.S. PATENT DOCUMENTS

| | | | |
|---|---|---|---|
| 4,137,852 A | 2/1979 | Pratt | |
| 4,596,290 A | 6/1986 | Bedney | |
| 4,664,202 A | 5/1987 | Applequist et al. | |
| 2003/0110998 A1 | 6/2003 | Meyer et al. | |
| 2005/0087350 A1 | 4/2005 | Bauer | |

FOREIGN PATENT DOCUMENTS

FR    2 957 221 A1    9/2011

OTHER PUBLICATIONS

French Preliminary Search Report issued Apr. 24, 2015 in French Application 14 57955, filed on Aug. 25, 2014 (with English Translation of Categories of Cited Documents and Written Opinion).
European Search Report issued in Application No. EP 15 18 2163 on Jan. 8, 2016.

*Primary Examiner* — Christopher J Novosad
(74) *Attorney, Agent, or Firm* — Oblon, McClelland, Maier & Neustadt, L.L.P.

(57) ABSTRACT

An agricultural machine having a trailed chassis and a transverse bar in several portions extending substantially transversely to the direction of advance in the work position and extending substantially parallel to the direction of advance in the transport position, the transverse bar includes two portions able to be folded around a first respective articulation with a substantially vertical axis, each portion supports a seeder device made up of a hopper and a seeder bar. Each seeder bar is fixed on the corresponding portion using a second articulation with a substantially horizontal axis oriented parallel to the direction of advance in the work position.

11 Claims, 3 Drawing Sheets

AGRICULTURAL MACHINE WITH AT LEAST ONE ARTICULATED SEEDER BAR

BACKGROUND OF THE INVENTION

Field of the Invention

The present invention relates to the general technical field of agricultural machinery. The invention relates to an agricultural machine having a trailed chassis and a transverse bar in several portions extending substantially transversely to the direction of advance in the work position and extending substantially parallel to the direction of advance in the transport position, the transverse bar includes two portions able to be folded around a first respective articulation with a substantially vertical axis, each portion supports a seeder device made up of a hopper and a seeder bar.

Discussion of the Background

Document FR 2,871,988 A1 describes such an agricultural machine with two parts that can be folded toward the front. This known agricultural machine is a tool-carrier that makes it possible to combine agricultural devices, such as seeders, to work over a greater working width. Each seeder is mounted on the transverse bar using a conventional three-point hitch. This conventional three-point hitch makes it possible to raise and lower the seeder. The use of such three-point hitches increases the width of the agricultural machine in the transport configuration, since each portion is folded toward the front. Taking the position of the wheels of the carriage into account, the seeders must be raised above the wheels. The stability of the agricultural machine during transport is therefore reduced, since the center of gravity is far from the ground. The instability is accentuated when the hoppers are full.

On other known wide agricultural machines, a device is provided to allow long transport. The transport direction is then perpendicular to the work direction. Such a device requires, in most cases, unhitching the tractor and hitching it in the other position to be able to transport the wide agricultural machine on roads.

SUMMARY OF THE INVENTION

The present invention aims to overcome the aforementioned drawbacks and seeks to propose a simpler wide agricultural machine with good terrain following and a reduced bulk during transport.

According to the invention, the agricultural machine is characterized in that each seeder bar is fixed on the corresponding portion using a second articulation with a substantially horizontal axis and oriented parallel to the direction of advance in the work position. Owing to this feature, the seeder bar can follow the terrain independently of the corresponding portion and the trailed chassis.

According to another feature of the invention, when at least one of the portions is positioned parallel to the direction of advance in the transport configuration, the corresponding seeder bar extends substantially parallel to the surface of the ground. In this way, the ground clearance of the agricultural machine is increased without modifying the height position of the center of gravity.

According to one feature of the invention, the second articulation is laterally offset relative to the position of the center of gravity of the seeder bar. Thus, the seeder bar is automatically aligned with the ground during transport and at least one of the ends of the seeder bar is freed from the ground to avoid contact with the ground during half-turn maneuvers at the end of the field.

BRIEF DESCRIPTION OF THE DRAWINGS

Other features and advantages of the invention will emerge from the following description in light of the appended drawings, which are provided solely as non-limiting examples of the invention. In these drawings.

DESCRIPTION OF THE PREFERRED EMBODIMENT

Figure 1:
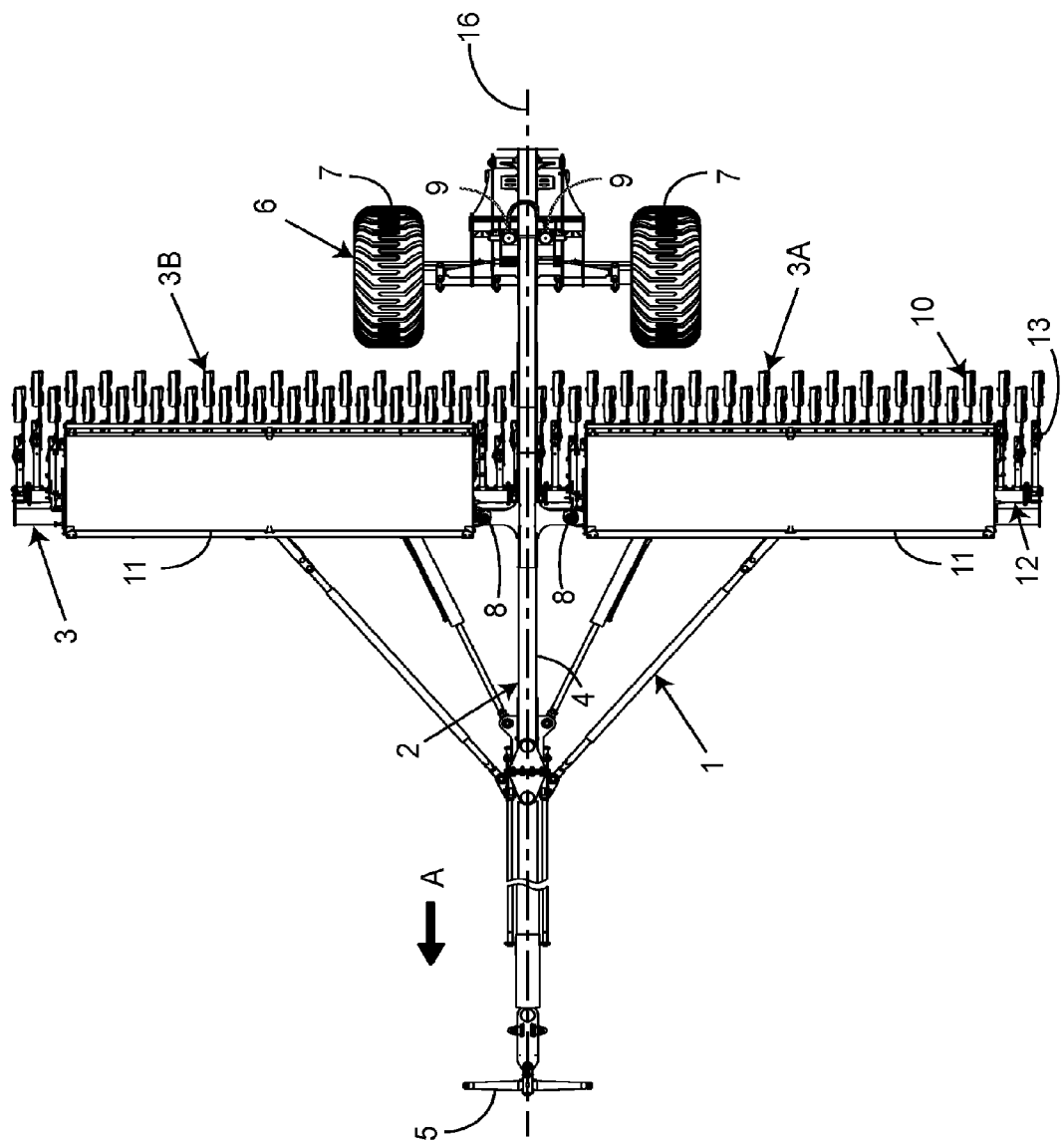
FIG. 1 is a top view of an agricultural machine according to the invention, in a work configuration.

The agricultural machine 1 according to the invention includes a trailed chassis 2 and a transverse bar 3 in several portions to be able to intervene over a wide work strip. As shown in FIG. 1, the transverse bar 3 has two portions 3A, 3B. The chassis 2 is made in the form of a longitudinal frame 4 equipped in the front with a hitching device 5 and in the rear with a carriage 6. The hitching device 5 is intended to be hitched to the hitch of a tractor (not shown). The tractor is made to move and drive the agricultural machine 1 in a direction of advance indicated by the arrow A. The invention thus relates to a trailed agricultural machine whereof the chassis 2 rests on the ground via the wheels 7 of the carriage 6. FIG. 1 shows the agricultural machine in its work configuration. One portion extends to the right and the other to the left of the longitudinal frame 4. The two portions 3A, 3B extend substantially transversely to the direction of advance A in a work configuration. They extend in the extension of one another and are substantially aligned in light of the direction of advance A. To reduce the width of this agricultural machine 1 during transport, the two portions 3A, 3B are folded to extend substantially parallel to the direction of advance A. In this folded position, the width of the agricultural machine 1 is considerably reduced, since each portion 3A, 3B is positioned substantially parallel to the longitudinal frame 4. In the example embodiment, the portions 3A, 3B can be folded by pivoting around a first articulation 8 with a substantially vertical axis. The pivoting of the portions 3A, 3B is controlled by double-acting jacks. The wheels 7 of the carriage 6 extend behind the portions 3A, 3B, and the portions 3A, 3B advantageously pivot forward. In one alternative, the portions 3A, 3B are folded toward the rear, when the wheels 7 are positioned in front of the portions 3A, 3B.

In order to adapt to the different work to be done, the height of the chassis 2 is adjustable relative to the carriage 6 using at least one actuator 9. In the illustrated example, the actuator 9 is made in the form of a jack, made up of a cylinder and a piston, which moves in one direction or the other under the action of a fluid. The actuator 9 is preferably a jack of the double-acting type. Advantageously, two actuators 9 extend between the carriage 6 and the chassis 2. These actuators 9 serve to raise or lower the chassis 2 of the agricultural machine 1.

Figure 2:
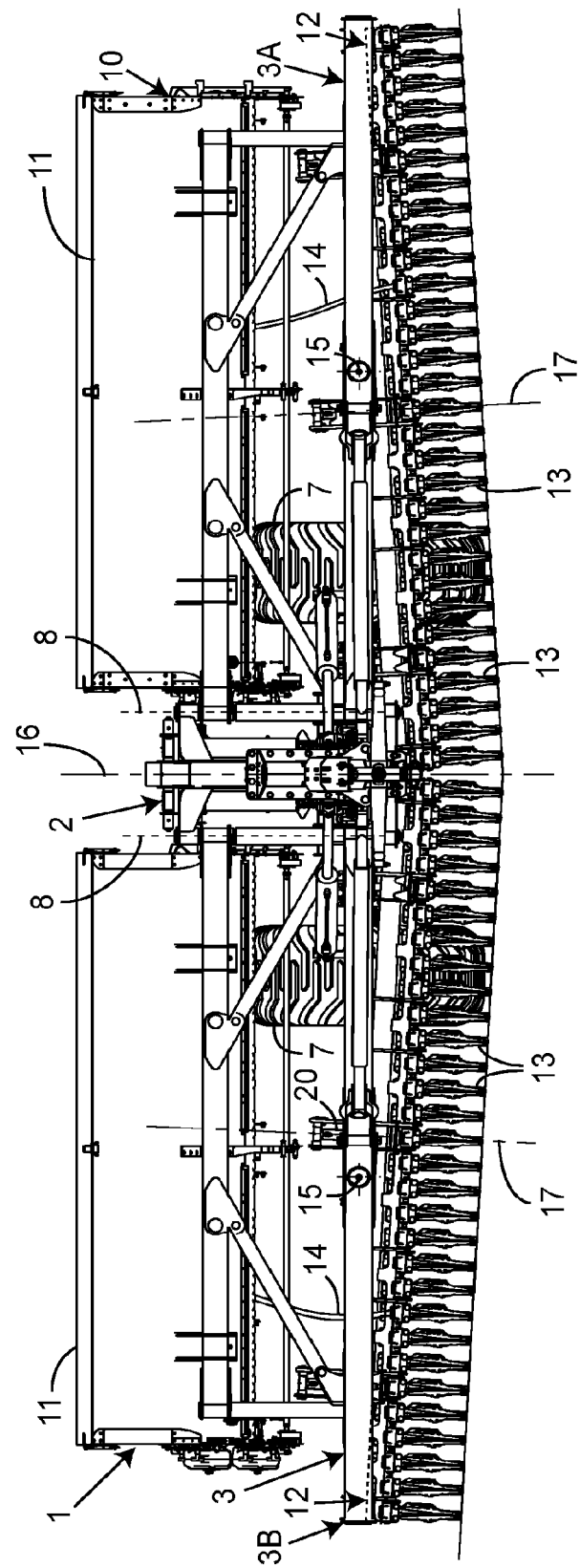
FIG. 2 is a front view of the agricultural machine during work.

FIG. 2 shows a front view of the agricultural machine 1 in a work position. Each portion 3A, 3B supports a seeder device 10 made up of a hopper 11 and a seeder bar 12. The agricultural machine 1 is therefore intended to sow seeds or other products. The hopper 11 makes up the seed reserve. In the lower part of the hopper 11, there is at least one distribution arrangement, the function of which is to remove a predetermined quantity of seeds. The distribution flow rate is adapted based on the speed of advance of the agricultural machine 1. A gearbox makes it possible to vary the distribution speed to adapt to the species to be seeded and the quantity of seeds per hectare. The seeder bar 12 groups together the burying elements 13, which form furrows at a predetermined depth to place the seeds therein. The work depth of the seeder bar 12 is adjusted using the actuators 9. The desired adjustment is guaranteed owing to wedges mounted on the rod of each actuator 9. Pipes 14 connect the burying elements 13 to the distribution arrangement to convey the seeds toward the ground. The pipes 14 therefore extend between the hopper 11 and the seeder bar 12. Only some of the pipes 14 are shown in the figures.

According to one important feature of the invention, each seeder bar 12 is fixed on the corresponding portion 3A, 3B using a second articulation 15 with a substantially horizontal axis oriented parallel to the direction of advance A in the work position. In this way, the seeder bar can follow the terrain independently of the corresponding portion 3A, 3B and the chassis 2. The seeder bar 12 is independent relative to the transverse bar 3 of the agricultural machine 1. Particularly advantageously, the hoppers 11 are rigidly fastened to the transverse bar 3. Each hopper 11 is mounted fixed on the corresponding portion 3A, 3B, the entire weight of the hopper 11 therefore being supported by the corresponding portion 3A, 3B. The second articulation 15 does not support the weight of the corresponding hopper 11, thus its dimensioning will be smaller. It will also be noted that the portions 3A, 3B have no ground bearing wheels and that the transverse bar 3 does not include an articulation with a horizontal axis oriented in the direction of advance A during the work. The seeder bar 12 follows the terrain owing solely to the second articulation 15. According to FIG. 2, the second articulation 15 is produced directly in the corresponding portion 3A, 3B. The articulation is relatively easy to produce, since the portion 3A, 3B is a beam, for example hollow, with a square transverse section. In one alternative, the second articulation 15 is positioned below the corresponding portion 3A, 3B. In another alternative, the second articulation 15 is positioned on the corresponding portion 3A, 3B.

Figure 3:
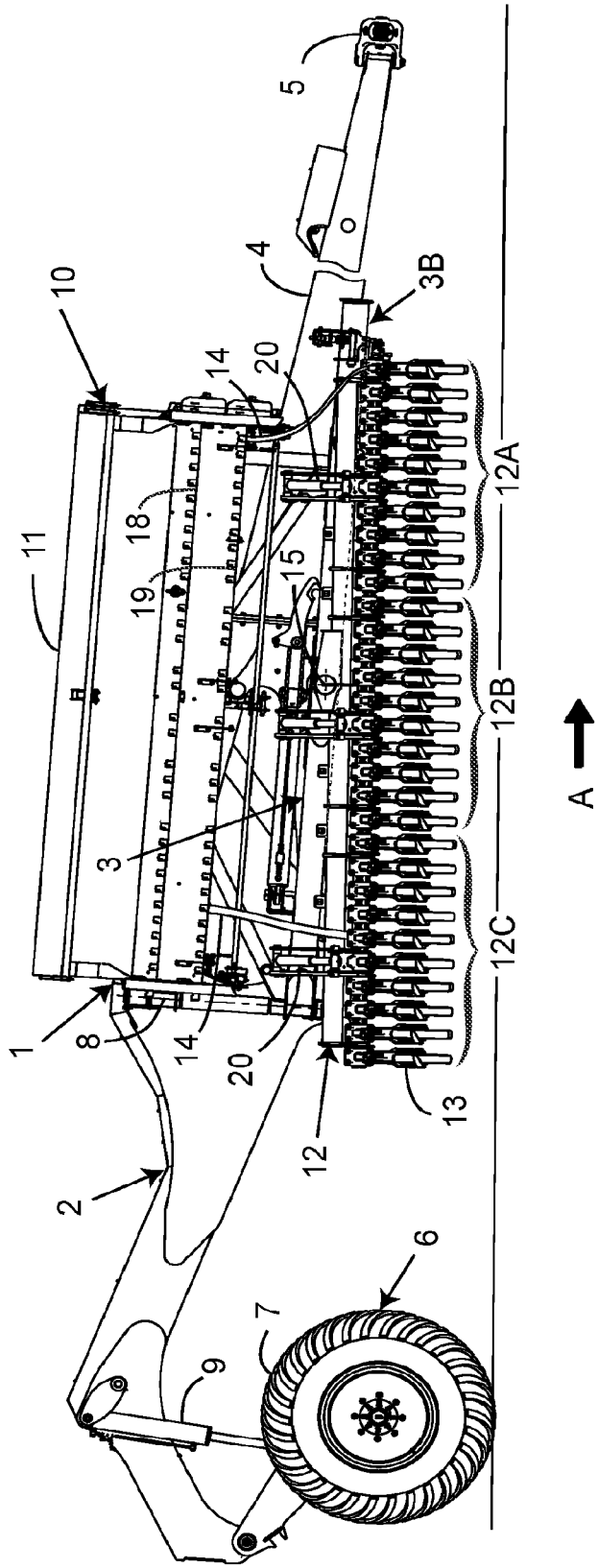
FIG. 3 is a side view of the agricultural machine during transport.

According to another feature, when at least one of the portions 3A, 3B is placed in the transport configuration, the corresponding seeder bar 12 extends substantially parallel to the surface of the ground. Thus, the ground clearance of the seeder bar 12 is substantially identical at both of its ends. FIG. 3 shows the agricultural machine 1 in side view in the transport configuration. The second articulation 15 is advantageously placed in the vicinity of the center of gravity of the seeder bar 12. The second articulation 15 is therefore remote from the median vertical plane 16. Such a position of the second articulation 15 makes it possible to have a more or less balanced seeder bar 12. Because it involves a seeder device 10, it is necessary for the seeding depth to be respected and to be constant on either side of the seeder bar 12. Generally, the burying elements 13 rest on the ground with a predetermined pressure or must work the ground at a given depth to ensure good germination of the seeds and homogenous plant growth. Owing to this second articulation 15, the seeder bar 12 is kept substantially parallel to the surface of the ground. Thus, the ground clearance of the seeder bar 12 is substantially identical for each of the ends of the seeder bar 12. This is an advantage during transport and during half-turn maneuvers at the end of the field by the agricultural machine 1. Advantageously, the seeder bar 12 pivots freely around the second articulation 15. The pivoting is free in the work position and the transport position. Since the seeder bar 12 pivots around the second articulation 15, the seeder bar 12 is able to move more or less away from the hopper 11 at its ends. Thus, the pipes 14 connecting the distribution arrangement to the burying elements 13 must be able to absorb the length difference. The pipes 14 are therefore configured to absorb the different positions of the seeder bar 12 during the work, and in particular length variations. In the example embodiment, the pipes 14 are telescopic. In another alternative, the pipes 14 are flexible.

According to another important feature of the invention, the second articulation 15 is laterally offset relative to the position of the center of gravity of the seeder bar 12. Owing to the off-centered position of the second articulation 15 relative to the seeder bar 12, the seeder bar 12 automatically aligns to the surface of the ground when the portions 3A, 3B are folded for transport. Particularly advantageously, the second articulation 15 extends between the vertical plane 17 passing through the center of gravity of the seeder bar 12 and the outer end of the seeder bar 12. With this lateral shift of the second articulation 15 in the outer half of the seeder bar 12, the outer end of the seeder bar 12 is automatically raised for the half-turn maneuvers at the end of the field. This thereby prevents the outer ends from coming into contact with the ground when the chassis 2 of the agricultural machine 1 moves. In the example embodiment shown in the figures, the second articulation 15 is produced directly in the corresponding portion 3A, 3B. One can also see that the agricultural machine 1 is symmetrical relative to the median vertical plane 16. In an alternative that is not shown, the second articulation 15 extends between the median vertical plane 16 of the agricultural machine 1 and the vertical plane 17 passing through the center of gravity of the seeder bar 12. This lateral shift of the second articulation 15 in the inner half of the seeder bar 12 makes it possible to raise the inner end of the seeder bar 12 automatically.

FIG. 3 shows the wide agricultural machine 1 in the transport position, and in particular the right portion 3B of the transverse bar 3. The seeder bar 12 of this portion 3B has a considerable working width, exceeding three meters. It will be noted that the width of the seeder bar is greater than that of the hopper 11. To further improve the adaptation to the terrain and following of the ground, the seeder bar 12 is divided into at least two sections 12A, 12B, 12C. Each section 12A, 12B, 12C is mounted using a respective jack 20. This is a hydraulic jack. The jack 20 is combined with a hydropneumatic device with adjustable pressure. Adjusting this pressure makes it possible to modify the depth control force of the burying elements 13. This hydropneumatic device on one hand makes it possible for the corresponding section 12A, 12B, 12C to adapt more precisely to the ground and on another hand allows the section 12A, 12B, 12C to clear the ground when it encounters an obstacle on the ground. Such an assembly by sections 12A, 12B, 12C contributes to quality seeding with a respected depth. In the illustrated example, the seeder bar 12 includes three independent sections 12A, 12B, 12C and three jacks 20. The agricultural machine 1 according to the invention is able of simultaneously sowing fertilizer and seeds. To that end, each hopper 11 is divided into two distinct reservoirs. The reservoirs are separated by a wall. The position of the wall is advantageously adjustable in the hopper 11. Each reservoir is provided with a respective distribution arrangement 18, 19. These distribution arrangements 18, 19 are advantageously superimposed, and are shown diagrammatically in FIG. 3. The distribution arrangement for fertilizer 18 extends substantially above the distribution arrangement for seeds 19. At the outlet of the distribution arrangement, the fertilizer and seeds are oriented toward the ground through a same pipe. The illustrated agricultural machine 1 is a seeder with a double distribution arrangement. According to the figures, the seeder device 10 is a seeder with mechanical distribution. Generally, the width of the hopper 11 for a mechanical seeder is substantially equal to the seeding width. In the agricultural machine 1 according to the invention, one can see that the width of the seeder bar 12 is greater than the width of the corresponding hopper 11. Burying members 13 thus extend below the chassis 2 to seed in the central zone of the agricultural machine 1. Advantageously, at least two burying elements 13 are positioned between the vertical planes passing through the first articulations 8. At the outer ends of the seeder bar 12, at least two burying elements 13 are positioned beyond the hopper 11. The respective distribution arrangements supplying these additional burying members are mounted and housed in the widthwise bulk of the hopper 11. The width of each distribution arrangement is compact, which makes it possible to add at least two distribution arrangements to supply the burying elements 13 that are added on at least one side of the hopper 11. In FIG. 1, three burying elements 13 extend beyond the width of the hopper 11 at the outer ends of the seeder bar 12 and two burying elements 13 extend beyond the width of the hopper 11 at the inner ends of the seeder bar 12.

According to an alternative that is not shown, the seeder device 10 is a pneumatic distribution seeder. The distribution is then done by at least one seed metering device, and each metering device then supplies one or more rows using delivery chutes. The distribution width is much smaller than the width of the hopper 11.

According to FIG. 3, it will be noted that the hopper is tilted forward. The vertical axis of the corresponding first articulation 8 is oriented forward. This tilt takes place because the chassis 2 is raised via the actuators 9 and the hitching device 5 is closer to the ground. The height of the hitching device 5 relative to the ground results from the tractor used and the height adjustment of the lifting system. According to the illustrated embodiment, the two portions 3A, 3B pivot around the first articulation 8 toward the front to arrive in the transport position.

The invention is of course not limited to the embodiments described above and shown in the appended drawings. Modifications remain possible, in particular regarding the composition or number of the various elements or by substituting technical equivalents, without, however, going beyond the scope of protection as defined by the following claims.

What is claimed as new and desired to be secured by Letters Patent of the United States is:

1. An agricultural machine comprising:
   a trailed chassis; and
   a transverse bar extending substantially transversely to a direction of advance in a work position and extending substantially parallel to the direction of advance in a transport position, the transverse bar includes two portions able to be folded around a first respective articulation with a substantially vertical axis, each portion of the transverse bar supports a seeder device made up of a hopper and a seeder bar,
   wherein each seeder bar is fixed on a corresponding portion of the transverse bar using a second articulation with a substantially horizontal axis oriented parallel to the direction of advance in the work position, and only the seeder bar is movable relative to the corresponding portion of the transverse bar around the second articulation.

2. The agricultural machine according to claim 1, wherein when at least one of the portions of the transverse bar is placed in the transport position, a corresponding seeder bar on the portion of the transverse bar placed in the transport position extends substantially parallel to a surface of a ground.

3. The agricultural machine according to claim 1, wherein pivoting around the second articulation is free in the work position and the transport position.

4. The agricultural machine according to claim 1, wherein the second articulation is laterally offset relative to a position of a center of gravity of the seeder bar.

5. The agricultural machine according to claim 1, wherein the second articulation extends between a vertical plane passing through a center of gravity of the seeder bar and an outer end of the seeder bar.

6. The agricultural machine according to claim 1, wherein the second articulation is produced directly in the corresponding portion of the transverse bar.

7. The agricultural machine according to claim 1, wherein the hopper is mounted fixed on the corresponding portion of the transverse bar.

8. The agricultural machine according to claim 1, wherein the portions of the transverse bar are free of bearing wheels.

9. The agricultural machine according to claim 1, wherein at least one of the seeder bars is divided into at least two sections, each section of the at least one of the seeder bars is mounted to the corresponding portion of the transverse bar using a jack.

10. The agricultural machine according to claim 1, wherein the two portions of the transverse bar pivot around the first respective articulation toward a front of the agricultural machine to arrive in the transport position.

11. The agricultural machine according to claim 1, wherein the seeder device is a seeder with mechanical distribution or a seeder with pneumatic distribution.

* * * * *